United States Patent Office 3,421,885
Patented Jan. 14, 1969

3,421,885
METHOD AND COMPOSITION FOR PRODUCING EXOTHERMIC REACTIONS
Arthur Adler, Easton, Pa., assignor to Chas. Pfizer & Co., Inc., New York, N.Y., a corporation of Delaware
No Drawing. Continuation-in-part of application Ser. No. 83,142, Jan. 17, 1961. This application Aug. 20, 1965, Ser. No. 481,430
U.S. Cl. 75—27                                26 Claims
Int. Cl. C21b 15/02

This application is a continuation-in-part of my prior application Ser. No. 83,142 filed Jan. 17, 1961, now abandoned.

This invention relates to new and improved exothermic reactions. It also relates to a method for the exothermic release of energy and production of useful substances and also to the production of intermediate products from which useful substances can be subsequently produced by the exothermic decomposition thereof. In particular, the invention is concerned with a method of manufacturing inorganic substances such as metals, alloys, metal compounds such as metal oxides, cermets, synthetic minerals and the like or similar substances.

Generally speaking, the manufacture of inorganic substances such as metals, alloys, cermets, metal oxides, synthetic minerals, and similar substances, usually involves rather high reacting temperatures. A problem which presents itself at elevated temperatures is the tendency of impurities from the surrounding environment, e.g. from crucibles, furnaces, atmospheres, etc., to enter the reaction and thereby adversely affect the end product. In addition, high temperature procedures are generally limited to compatible systems, such as, for example, the production of alloys from miscible metals by melting. Such methods are not applicable to the production of homogeneous alloys from non-miscible metals. Nor are high-temperature melting methods applicable in producing homogeneous inorganic compositions from metal and metal oxide systems or in producing finely dispersed homogeneous compositions of ultra-fine particle size whether as a metal product, a metal-metal oxide mixture, oxides, etc.

As a general proposition, reactions having low initiation temperatures would be most desirable economically. However, such reactions in conventional practice are limited to a few systems. There is a need for reactions requiring little energy input to form inorganic substances or intermediate products from which a desirable inorganic end product can be produced by exothermic decomposition at low activation temperatures.

It is the object of the present invention to provide new and improved chemical reacting systems capable of being initiated at low temperatures and of releasing a large amount of energy.

Another object is to provide a chemical system in which the components are capable of reacting exothermically at low initiating temperatures and capable of producing a desired inorganic end-product.

A still further object is to provide an intermediate product containing as ingredients a metal in a combined form mixed with a carboxylic acid or a salt thereof and an oxidizing acid or a salt thereof, the amounts of said ingredients being such that said product will decompose exothermically when heated to a low initiating temperature.

As a preferred feature, the invention provides a method of producing inorganic substances by reacting a system containing as reagents an acetate anion, a nitrate anion and a metal cation, the ratio of the acetate anion to the nitrate anion being such that the system reacts exothermically when subjected to a low initiating temperature to release a large amount of energy and form an inorganic end product.

These and other objects will more clearly appear from the following disclosure and the appended claims.

Stating it broadly, I have discovered a method of effecting exothermic reactions at low initiating temperatures, said reactions having utility as a source of energy or as a means of producing useful inorganic substances, such as metals or metal sponges, homogeneous compositions of alloys, cermets, ceramics, metal oxides, synthetic minerals, and the like or similar substances. In carrying out my method, I employ a series of steps which include providing a batch of ingredients comprising a metal cation, a first reagent selected from the group consisting of carboxylic acids of 2 to 10 carbon atoms and salts thereof, and a second reagent selected from the group consisting of oxidizing acids and salts thereof, heating said batch to effect mixing of the ingredients and continuing said heating for a time at least sufficient to boil off volatile components, including any excess volatile reagent, and to form a thick viscous liquid which solidifies to a solid glassy mass when cooled to ambient temperature. If heating is continued, the viscous liquid decomposes exothermically.

The metal cation employed in carrying out the invention comprises at least one metallic element in combined form, said element being selected from the group consisting of those of atomic number at least 24 of the Groups I-B, II-B, III-A, IV-A, V-A, VI-A, VI-B, VII-B, and VIII of the Periodic Table and thorium and uranium (note pages 400 and 401 of the Handbook of Chemistry and Physics, 39th Ed., 1957, published by the Chemical Rubber Publishing Co.). The term "metal cation" referred to hereinabove is meant to include those elements having metallic properties and excludes the non-metallic elements arsenic, selenium and tellurium of said groups.

To achieve the results of the invention, the ingredients employed in the mixture are proportioned so that the sum of the concentrations of the so-called first and second reagents is at least one molar equivalent per mole of said metal cation present, the concentrations being further selected to provide a molar ratio of the first reagent to the second reagent of at least 0.2 and less than about 10 after vaporization of any excess volatile reagent from the mixture. Advantageously, the molar ratio of the first to the second reagent many range from about 0.4 to 2.5 after vaporization of excess reagent and, more advantageously, from about 0.8 to 1.7.

The batch of ingredients is preferably substantially non-aqueous, although water may be present in the starting mix since it can be driven off during the heating step. In heating the batch, the temperature should be at least sufficient to effect a blending of the ingredients together into a substantially homogeneous liquid with the evolution of some volatile constituents; however, precipitation is sometimes observed without adversely affecting the results. After homogenization of the ingredients has been completed, the batch is additionally heated to a temperature below the exothermic initiating temperature sufficient to effect a further evolution of volatile constituents and to bring about a physico-chemical change, evidence of such change being the formation of a viscous liquid which upon cooling to room temperature becomes a substantially homogeneous solid-glassy mass or intermediate product, usually having a color different from that of the original mix. The glassy intermediate product may be maintained in this state indefinitely and subsequently reheated to an exothermic initiating temperature to complete the reaction, or, if desired, the complete reaction may be carried out in one uninterrupted heating step. The intermediate product is an excellent energy source and has utility in that connection, for example, in the carrying out of chemical reactions where the in situ release of energy, and a metal cation catalyst are desired.

It has been observed that in heating the batch of ingredients to below the exothermic initiating temperature, the reaction appears to go continuously through three stages: (1) a mixing stage in which the ingredients are caused to mix at one temperature range with evolution of volatile constituents, (2) a second stage in which there is a further evolution of volatile constituents at a succeeding higher temperature range during which a viscous mass begins to form, and (3) a third stage at a still higher temperature range during which the formation of the viscous mass is substantially completed. Thus, in carrying out the reaction, the batch may be continuously heated up to and past the mixing temperature right on through the formation of the viscous mass and through the exothermic initiating temperature to complete the reaction with the release of energy and the formation of an inorganic by-product; or, if desired, the heating may be interrupted at either of the stages and continued later.

I have found it apparently advantageous although not essential for my purpose in carrying out the exothermic reaction that the carboxylic component or its equivalent be one whose anhydride has a boiling point near or in the neighborhood of the exothermic initiating temperature.

The oxidizing acid or the salt thereof employed in carrying out the reaction may also be one capable of forming an anhydride or some compound that exhibits anhydridic properties, for example an oxide of an element such as nitrogen, which when formed will leave the system rapidly during exothermic decomposition.

The metal may be added to the batch by the solution thereof or in any combined form, such as an oxide, hydroxide, a carbonate, a metal hydrate, an ammonium complex, a chelate or as a carboxylate salt, for example, as an acetate, or as a salt of a mineral acid, such as a nitrate. Where the metal is added as the acetate, the acetate anion is considered in determining the amount of said first reagent present. Likewise, where the metal is added as a nitrate, the nitrate anion is considered in determining the amount of the second reagent present. Thus, it does not matter how the additions of the ingredients are made so long as the batch provided for the reaction will contain a metal cation commingled with the first reagent and the second reagent.

In carrying out my invention using anhydrous acetic acid, fuming nitric acid and a metal salt or compound as the reactants, I have observed that the reaction tends to go through the aforementioned three stages at rather low temperatures ranging from about room temperature up to about 150° C.

With respect to the foregoing reagents, the first stage involves the forming of a batch by the mere placement of the materials in a suitable reacting vessel, e.g. a glass beaker, and heating the batch to a temperature in the neighborhood of about 75° C., i.e. between 50 and 100° C. In this temperature region, the materials blend with each other, with liberation of gases, vapors or other volatile constituents which may be reclaimed by condensation for reuse.

The second stage occurs with additional heating from about 100° C. to 120° C. accompanied by a further release of volatile constituents as a viscous mass begins to form. With a further heating to about 135° C. the formation of the viscous mass is completed, and the evolution of gases and vapors ceases. The ingredients in this state can be held at 120° to 135° C. without further activation or cooled to room temperature to form a solid glassy mass as an intermediate product. However, upon further heating to an exothermic initiating temperature in the neighborhood of about 140° to 150° C. or above, activation occurs and the intermediate product is decomposed exothermically. Where the intermediate has been cooled to room temperature, it may be ground into a fine powder, heated to 150° C. and exothermically decomposed to produce a disperse product, e.g. a metal or oxide powder and a gaseous by-product.

Where the first reagent in the reaction is acetic acid or a derivative thereof, the exothermic initiating temperature appears to be in the neighborhood of about 150° C. Where the first reagent is derived from other carboxylic acids or their equivalents, the exothermic initiation temperature may be higher or lower.

Examples of monobasic carboxylic materials of the aliphatic group which may be used as the first reagent in carrying out the invention are: acetic acid ($CH_3COOH$), propionic acid ($C_2H_5COOH$), butyric acid ($C_3H_7COOH$), valeric acid ($C_4H_9COOH$), caproic acid ($C_5H_{11}COOH$), heptoic acid ($C_6H_{13}COOH$), caprylic acid ($C_7H_{15}COOH$), nonylic acid ($C_8H_{17}COOH$), capric acid ($C_9H_{19}COOH$), lactic acid ($CH_3CHOHCOOH$), glycolic $$(CH_2OHCOOH)$$

and/or the anhydrides, or salts thereof. The aliphatic monobasic acids up to $C_9H_{19}COOH$ are preferred, since these acids are liquids at ambient temperature while the higher members tend to exist as waxy solids and render the reaction sluggish. Acetic acid and the salts thereof are preferred. The aliphatic dibasic and polybasic acids of the carboxylic group or the salts thereof may likewise be used. Examples of such dibasic acids are oxalic [$(COOH)_2$], malonic [$CH_2(COOH)_2$], succinic $$(CH_2)_2(COOH)_2$$

and also such other acids as glutaric, adipic, pimelic, suberic, azelaic, sebacic, malic, and tartaric acids and salts thereof. Illustrative of aliphatic polycarboxylic acids are citric and tricarballylic acids. Aromatic carboxylic acids or the salts thereof may also be employed, for example phthalic [$C_6H_4(COOH)_2$], benzoic, toluic, salicylic and cinnamic acids. Unsaturated acids which may be employed include maleic, fumaric, itaconic, acrylic, methacrylic and crotonic. Substances equivalent to carboxylic acids may also be used; for example, the carboxylic acid may be replaced by a substance convertible thereto, such as the corresponding aldehyde or acid anhydride.

Concerning the oxidizing acid, I prefer to use nitric acid or salts of the acid which during the reaction will yield a nitric anhydride such as dinitrogen (IV) tetraoxide ($N_2O_4$), or a gas which has properties similar to an anhydride. Examples of other oxidizing acids are those based on chlorates, perchlorates, permanganates, chromates, dichromates, peracetates and the like.

In achieving the preferred results of the invention, I have found, starting with a system comprising the acetate and nitrate anions or components and the metal cation, preferably a dipositive metal cation, that the preferred minimum mole ratio between the acetate and nitrate ions should be at least 0.2. I have found that with at least this ratio, and even one in which an excess of acetate on a molar ratio basis is used, the reaction can be initiated exothermically, after mixing of the ingredients and the heating thereof, to release a large amount of energy. The products of the reaction are gases and the metal cation in the form of an oxide or elemental metal, or mixtures thereof.

To illustrate the foregoing, reaction batches were produced containing nickel as the metal cation and containing an acetate and a nitrate reagent. Where the reactants were nickel acetate, nickel nitrate and acetic acid as solvent, the molar ratios were calculated on the acetate and nitrate salts, any excess reagent present being removed by volatilization during heating.

Where ingredients charged were nickel acetate, nitric acid and acetic acid, the molar ratios were based on the acetate salt and the nitric acid, any excess reagents present being removed by volatilization during heating.

Where the reaction mixture was formed with nickel acetate, nickel nitrate, nitric acid and acetic acid, the molar ratios were based on the acetate and nitrate salts, any excess reagents present being removed by volatilization during heating.

The ingredients were combined in a glass beaker, and the batch heated and the ingredients caused to mix. The heating was continued to remove volatile components, including any excess volatile reagent present, and to form a viscous liquid, which reacted exothermically on further heating. The inorganic product remaining was then subjected to reduction by hydrogen to determine weight loss. As illustrative of a group of mixtures tested, reference is made to Table I as follows:

TABLE I

| Batch No. | Reagents | Mole Ratio of Acetate + Nitrate to Metal Cation | Mole Ratio of Acetate to Nitrate | Hydrogen Weight Loss, percent |
|---|---|---|---|---|
| B-1 | 0.1 M Ni(OAc)₂ [a]<br>0.1 M Ni(NO₃)₂<br>25 ml. HOAc [b] | 2 | 1 | |
| B-2 | 0.2 M Ni(OAc)₂<br>0.2 M HNO₃<br>50 ml. HOAc | 3 | 2 | 4.3 |
| B-3 | 0.1 M Ni(OAc)₂<br>0.05 M Ni(NO₃)₂<br>25 ml. HOAc<br>0.1 M HNO₃ | 2 | 2 | 21.5 |

[a] Nickel acetate.   [b] Acetic acid.

Batch No. B-1, which contained 25 ml. of acetic acid as the solvent, reacted smoothly. Batch No. B-2 which contained twice as much acetic acid reacted smoothly and the inorganic product produced exhibited a weight loss of about 4.3%, indicating that a substantial amount of metallic nickel was present in the product. In Batch No. B-3, in which 0.1 M of nitric acid was added along with acetic, an unusually vigorous exothermic reaction was observed. As will be noted from Table I, a hydrogen weight loss of 21.5% was obtained, indicating that a substantial portion of the final product was in the form of an oxide of nickel.

Additional tests were conducted illustrating the effect of varying the amount of nitrate component on one hand and the acetate component on the other. The results obtained are given in Table II and III as follows:

TABLE II

[Using 0.1 M Ni(OAc)₂ as one of the reagents and 25 ml. of acetic acid as the solvent]

| Batch No. | Nitrate Reagent | Mole Ratio of Acetate + Nitrate to Metal Cation | Mole Ratio of Acetate to Nitrate | Hydrogen Weight Loss |
|---|---|---|---|---|
| B-4 | 0.1 M Ni(NO₃)₂ | 2 | 1 | 13.8 |
| B-5 | 0.09 M Ni(NO₃)₂ | 2 | 1.11 | 16.8 |
| B-6 | 0.08 M Ni(NO₃)₂ | 2 | 1.25 | 10.1 |
| B-7 | 0.06 M Ni(NO₃)₂ | 2 | 1.67 | 4.6 |

TABLE III

[Using 0.1 M Ni(NO₃)₂ as one of the reagents and 25 ml. of acetic acid as the solvent]

| Batch No. | Acetate Reagent | Mole Ratio of Acetate + Nitrate to Metal Cation | Mole Ratio of Acetate to Nitrate | Hydrogen Weight Loss |
|---|---|---|---|---|
| B-8 | 0.1 M Ni(OAc)₂ | 2 | 1 | 6.8 |
| B-9 | 0.08 M Ni(OAc)₂ | 2 | 0.8 | |
| B-10 | 0.06 M Ni(OAc)₂ | 2 | 0.6 | |
| B-11 | 0.04 M Ni(OAc)₂ | 2 | 0.4 | 17.2 |

As stated hereinbefore, the metal cation may be added to a mixture by dissolving metal in a solvent, such as nitric acid, or by adding it as an oxide, hydroxide, carbonate, etc. The use of nickel carbonate as a source of metal cation is shown in Table IV as follows:

TABLE IV

| Batch No. | Reagents | Hydrogen Weight Loss |
|---|---|---|
| B-12 | 0.1 M Ni(NO₃)₂<br>0.1 M Ni(CO₃)<br>25 ml. HOAc | 7.04 |
| B-13 | 0.2 M NiCO₃<br>0.2 M HNO₃<br>25 ml. HOAc | 2.01 |
| B-14 | 0.1 M Ni(OAc)₂<br>0.1 M NiCO₃<br>0.2 M HNO₃<br>35 ml. HOAc | 3.21 |

All mixtures reacted exothermically. As will be noted, the hydrogen weight loss ranged from 2.01 to 7.04, indicating the presence of substantial amounts of metallic nickel in the product remaining after the completion of the reaction.

While it is preferred that the batch mixture be substantially non-aqueous, it may be advantageous in some instances to have water present together with the solvent. For example, the reaction of a mixture containing 0.1 M Ni(NO₃)₂, 0.1 M NiCO₃ and 15 ml. acetic acid is improved by adding 5 ml. of water to the mixture.

In addition to the system based on nickel, tests were also conducted on a copper system using copper acetate and copper nitrate as a source for both the metal cation and the first and second reagent.

Reaction mixtures containing copper acetate, copper nitrate and 25 ml. acetic acid, with the acetate mole ratio ranging from about 0.4 to over 5, were tested. Hydrogen weight loss of the product remaining after the reaction was determined, with results as given in Table V as follows:

TABLE V

| Batch No. | Nitrate Reagents | Mole Ratio of Acetate + Nitrate to Metal Cation | Mole Ratio of Acetate to Nitrate | Hydrogen Weight Loss |
|---|---|---|---|---|
| B-15 | 0.04 M Cu(OAc)₂<br>0.1 M Cu(NO₃)₂ | 2 | 0.4 | 12.8 |
| B-16 | 0.05 M Cu(OAc)₂<br>0.1 M Cu(NO₃)₂ | 2 | 0.5 | 9.7 |
| B-17 | 0.06 M Cu(OAc)₂<br>0.1 M Cu(NO₃)₂ | 2 | 0.6 | 3.95 |
| B-18 | 0.07 M Cu(OAc)₂<br>0.1 M Cu(NO₃)₂ | 2 | 0.7 | 2.69 |
| B-19 | 0.08 M Cu(OAc)₂<br>0.1 M Cu(NO₃)₂ | 2 | 0.8 | 5.46 |
| B-20 | 0.09 M Cu(OAc)₂<br>0.1 M Cu(NO₃)₂ | 2 | 0.9 | 4.09 |
| B-21 | 0.1 M Cu(OAc)₂<br>0.1 M Cu(NO₃)₂ | 2 | 1.0 | 2.11 |
| B-22 | 0.1 M Cu(OAc)₂<br>0.09 M Cu(NO₃)₂ | 2 | 1.11 | 2.19 |
| B-23 | 0.1 M Cu(OAc)₂<br>0.08 M Cu(NO₃)₂ | 2 | 1.25 | 1.18 |
| B-24 | 0.1 M Cu(OAc)<br>0.07 M Cu(NO₃)₂ | 2 | 1.43 | 1.28 |
| B-25 | 0.1 M Cu(OAc)₂<br>0.06 M Cu(NO₃)₂ | 2 | 1.67 | 2.72 |
| B-26 | 0.1 M Cu(OAc)₂<br>0.05 M Cu(NO₃)₂ | 2 | 2.0 | 3.99 |
| B-27 | 0.1 M Cu(OAc)₂<br>0.04 M Cu(NO₃)₂ | 2 | 2.5 | 3.62 |
| B-28 | 0.1 M Cu(OAc)₂<br>0.03 M Cu(NO₃)₂ | 2 | 3.33 | 6.72 |
| B-29 | 0.1 M Cu(OAc)₂<br>0.02 M Cu(NO₃)₂ | 2 | 5.0 | 11.3 |

It was observed that as the proportions of the reactants varied from excess nitrate to excess acetate, the reactions decreased in violence. A test conducted at an acetate to nitrate ratio of 10 to 1 indicated that, at such high ratios, the reaction did not appear to go to completion. At acetate to nitrate ratios of about 0.6 to 2.5, the hydrogen weight loss ranged from about 1.18 to 5.46, indicating that metallic copper was present in the final product.

As illustrative of additional embodiments of the invention, the following examples are given:

EXAMPLE 1

Nitric acid was reacted with acetic acid and $CrO_3$ by forming a batch containing 0.8 ml. of fuming nitric acid of specific gravity about 1.5, 1.2 ml. of anhydrous acetic acid of specific gravity about 1.049 and 1 gram $CrO_3$. The batch was heated in a porcelain dish of about 100 ml. capacity up to a temperature of about 150° C. As the temperature approached 100° C., it was noted that the ingredients homogenized with some liberation of volatile constituents. Between 100 to 120° C. there was a further liberation of volatile and a change in the physical characteristics of the mixture. From 120° to 135° C. the intermediate product began to form and when the temperature reached about 150° C. the resulting intermediate product reacted exothermically within a few seconds to release energy accompanied by a marked increase in temperature as evidenced by a luminous heat cloud of gases and finely divided $Cr_2O_3$ as the inorganic by-product.

In utilizing this embodiment of the invention as a source of energy and as a means of freshly producing an oxide catalyst in situ for the carrying out of other reactions, I can produce the intermmediate product by stopping the reaction after the glassy mass is formed but before it reaches the exothermic initiating temperatures, cooling the product to room temperature, grinding the cooled product and using it in this condition. For example, by mixing the ground intermediate product with ingredients to be reacted, e.g. hydrocarbons such as petroleum, and by heating the mixture through the exothermic initiating temperature of the contained intermediate product, energy is suddenly released to promote the reaction together with the simultaneous production of a fresh catalyst.

In the production of metal compositions or certain of the metal oxides, I prefer to use a mole ratio of the first reagent to the second reagent of at least about 0.8 and up to about 1.7. Thus, where the first reagent is the acetate or its equivalent and the second reagent is the nitrate or its equivalent, the mole ratio of acetate anion to nitrate anion should be at least about 0.8 and up to about 1.7. Acetic anhydride is considered as equivalent to two acetates. Likewise, dinitrogen (IV) tetraoxide ($N_2O_4$) is considered as equivalent to two nitrates.

Examples 2 to 6 which follow are illustrative of the production of metal oxide compositions when the exothermic reaction is carried out in air in an open vessel.

EXAMPLE 2

To a solution comprising 306.3 parts of acetic anhydride of specific gravity 1.082 and 60 parts anhydrous acetic acid is added 241.6 parts of hydrated copper nitrate and 379.4 parts of hydrated lead acetate. The batch is heated up to 140° C. in an open beaker through each of the stages of the reaction as described in Example 1 until it reaches about 140° C. and exothermic decomposition obtains. After liberation of all of the gaseous products, an inorganic product comprising an oxide of copper and lead is obtained characterized by a very fine particle size not exceeding about 5 microns and an orange-olive drab color. The foregoing proportions of ingredients are expressed in molar quantities as follows:

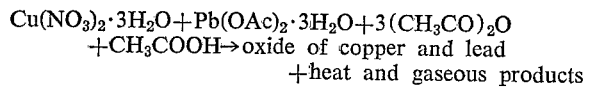

It will be noted that the ratio of the sum of the acetate and nitrate components combined with the metal cations amounts to 2 moles per mole of metal cation. Excess solvent in the form of acetic acid and acetic anhydride is present. Propionic acid or its salt could be similarly used.

EXAMPLE 3

A batch is formed by mixing 1397.5 parts by weight of hydrated copper acetate, 241.6 parts by weight of hydrated copper nitrate, 484.9 parts by weight of basic copper carbonate (assayed about 53% copper), and 600 parts by weight of chromium trioxide by tumbling in a porcelain jar mill at about 15° C. for 60 minutes to obtain a uniform mixture. The mixture is removed from the mill and the solids wetted down to form a saturated paste with a solution comprising 70.1 parts by weight of ammonium hydroxide (specific gravity 0.8974) and with 660 parts by weight of anhydrous acetic acid. The paste is allowed to soak about 60 minutes and is then tumbled for about 15 minutes, after which the mixture is allowed to dry at a temperature of about 10° to 15° C. This mixture can be diluted in excess acetic anhydride, or acid, or reacted as prepared by heating as in Examples 1 and 2. Upon heating to about 140° C., i.e. at least to the exothermic initiating temperature, the reaction goes forward exothermically, with the liberation of heat and gases and with the formation of a black inorganic compound comprising oxide of copper and chromium. The proportions of ingredients stated hereinabove are expressed in molar quantities as follows:

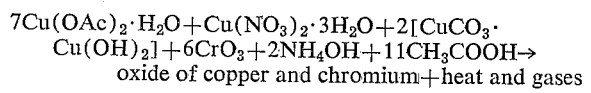

The invention may be employed in the preparation of certain metal oxides of the ferrite type, or certain of the refractory oxides such as an oxide of nickel and thorium. As illustrative of the foregoing, Examples 4 and 5 are given as follows:

EXAMPLE 4

Certain of the ferrites have been produced from alkaline earth metals. In producing an oxide of beryllium and iron, I take 1860 parts by weight of anhydrous acetic acid and add to it a mixture of 187.1 parts by weight of hydrated beryllium nitrate and 808 parts by weight of hydrated ferric nitrate. The thus formed batch is heated through the various phases of the reaction in the presence of air up to the exothermic initiation temperature. The foregoing amounts of ingredients are expressed in molar quantities as follows:

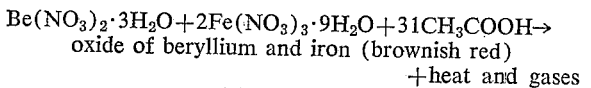

EXAMPLE 5

In forming a refractory compound from nickel and the rare earth metal thorium, a batch is formed comprising 1380 parts by weight of anhydrous acetic acid, 290.8 parts by weight of hydrated nickel nitrate, and 552.2 parts by weight of hydrated thorium nitrate and the batch heated in air to 140° C., the foregoing proportions being expressed in molar quantities as follows:

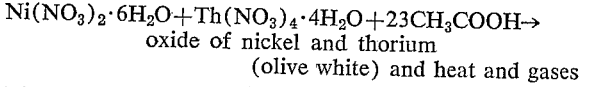

The resulting oxide is homogeneous and is stable at 2100° C.

As has been stated hereinbefore, the environment of the reaction is preferably substantially non-aqueous except for water of hydration which may or may not be present. If excess water is present, it can be removed by drying or suitable heating of the mixture.

EXAMPLE 6

In forming magnetic oxides of the ferrite type, for example comprising oxides of zinc, nickel and iron, the following ingredients are mixed: 3720 parts by weight of anhydrous acetic acid, 297.5 parts by weight of hydrated zinc nitrate, 290.8 parts by weight of hydrated nickel nitrate and 1616.1 parts by weight of hydrated ferric nitrate. The reaction is initiated at 140° C. in air, the foregoing amounts being expressed in molar quantities as follows:

$$Zn(NO_3)_2 \cdot 6H_2O + Ni(NO_3)_2 \cdot 6H_2O + 4Fe(NO_3)_3 \cdot 9H_2O + 62CH_3COOH \rightarrow \text{oxides}$$

of zinc, nickel and iron and heat and gases

The product obtained is black.

In producing metals, alloys, intermetallic compounds, metal-nonmetal systems (cermets), and homogeneous compositions from immiscible metal systems, in accordance with my invention, I prefer to carry out the reaction in the absence of air, such as in an inert or reducing atmosphere, or in an atmosphere of its own gases, as obtained in a sealed or covered container. As an example for producing sponge chromium, sponge cobalt, sponge manganese, sponge copper and sponge zinc the following is given:

EXAMPLE 7

Chromium

To 2820 parts by weight of anhydrous acetic acid are added 200 parts by weight of $CrO_3$ and 800 parts by weight of ammonium nitrate. The batch is heated as described in the previous examples through the various phases of the reaction to the exothermic initiating temperature of about 140° C. in a covered container, the foregoing proportions being expressed in molar quantities as follows:

$$2CrO_3 + 10NH_4NO_3 + 47CH_3COOH \rightarrow 2Cr$$

and heat and gases

It will be noted that sufficient acetic acid is employed to provide acetate reagent for the reaction and excess acetic acid as solvent.

Cobalt

In producing sponge cobalt, 236.1 parts of anhydrous cobalt acetate and 80 parts of ammonium nitrate are added to a solution comprising 63 parts of fuming nitric acid and 300 parts of anhydrous acetic acid to form a batch which is heated in a covered vessel through the various phases of the reaction up to the exothermic initiation temperature of about 140° C. The amounts of ingredients stated above are expressed in molar quantities as follows:

$$Co(OAc)_3 + NH_4HNO_3 + HNO_3 + 5CH_3COOH \rightarrow Co$$

and heat and gases

The sponge is very active and may be easily compressed to suitable shapes and sintered.

Manganese

Both the nitrate and the acetate of the element are used:

Ingredients in parts by weight:
287 $Mn(NO_3)_2 \cdot 6H_2O$
245 $Mn(OAc)_2 \cdot 4H_2O$
420 $CH_3COOH$ The reaction at 140° C. in a covered vessel using the foregoing proportions is given in molar quantities as follows:

$$Mn(NO_3)_2 \cdot 6H_2O + Mn(OAc)_2 \cdot 4H_2O + 7CH_3COOH \rightarrow 2Mn + \text{heat and gases}$$

Copper

In this test, the following ingredients in parts by weight are used:

727.4 basic copper carbonate (assay at 53% Cu)
143.1 cuprous oxide
900 anhydrous acetic acid
126 fuming nitric acid This mixture, which formed a paste, is reacted in a covered vessel at 140° C. in the foregoing proportions given in molar quantities as follows:

$$3[CuCO_3 \cdot Cu(OH)_2] + Cu_2O + 2HNO_3 + 15CH_3COOH \rightarrow 8Cu + \text{heat and gases}$$

Zinc

When zinc is prepared by the usual prior art methods, it tends to sublime at about 500° C. when being reduced to the metal, while zinc acetate sublimes in a covered vessel at about 250° C. However, in accordance with this invention, the sponge metal is produced without sublimation.

Ingredients in parts by weight:
183.5 zinc acetate
126 nitric acid (fuming)
360 anhydrous acetic acid The reaction at 140° C. in a covered vessel is expressed in the foregoing proportions stated in molar quantities as follows:

$$Zn(OAc)_2 + 2HNO_3 + 6CH_3COOH \rightarrow Zn + \text{heat and gases}$$

It will be noted that the foregoing illustrations show the production of metals from the various groups of the Periodic Table of Elements, such as Ib, IIb, VIa, VIIb, the iron group metals, and others. For example, platinum group metals may also be produced by this process.

In addition to the foregoing, similar results may be obtained with thorium. A batch is formed comprising 552.2 parts by weight of hydrated thorium nitrate and 900 parts by weight of anhydrous acetic acid, which is heated in a covered vessel as in previous examples to a temperature of about 140° C. to effect exothermic decomposition in accordance with the foregoing proportions stated in molar quantities as follows:

$$Th(NO_3)_4 \cdot 4H_2O + 15CH_3COOH \rightarrow Th + \text{heat and gases}$$

As illustrative of the preparation of ingredients employed in the production of type 316 stainless steel containing 2 to 3% molybdenum, the following example is given:

EXAMPLE 8

In producing an alloy containing about 73.1% Fe, 17.2% Cr, 6.9% Ni and 2.8% Mo, the following steps are employed:

(a) Iron nitrate is first prepared by dissolving 2457.4 parts of pure iron in excess nitric acid and water according to the following reaction:

$$Fe + 6HNO_3 \rightarrow Fe(NO_3)_3 + 3NO_2 + 3H_2O$$

(b) Then 298.8 parts of nickel oxide is dissolved in excess acid solution $$2NiO + 6HNO_3 \rightarrow 2Ni(NO_3)_2 + 2H_2O + 2HNO_3$$

The two solutions are then mixed together, filtered to remove the impurities and then heated at about 115° C. to 120° C. to form mixed salts of the two metals. The foregoing heating drives off the excess water, excess nitrogen dioxide, gases, etc. The mixed crystals formed in this manner comprise about 8680 parts of the nitrate radical and about 522 parts of water of hydration. To this salt is added 1100 parts by weight of chromium trioxide, 196 parts of ammonium molybdate and 33,000 parts of anhydrous acetic acid to form a batch which is then reacted at about 140° C. in a covered vessel to form the desired product.

EXAMPLE 9

Similarly, nickel-silver brass compositions may be prepared from scrap metal. Brass turnings of about 5402 parts by weight analyzing 63.5% Cu, 21.7% Zn, 10.8% Ni and 3.8% Pb are dissolved in a solution of excess nitric acid and concentrated in the same manner as stated in Example 8, except at a temperature of about 130° C. After the mixed crystals are formed, they constitute approximately 13,500 parts by weight. They comprise approximately 6820 parts by weight of the nitrate radical and approximately 1240 parts by weight of water of hydration. On the basis of the chemical analysis of the brass turnings, 83 moles of metal are assumed to be present in combined form. To the mixed crystal are added 28,080 parts by weight of anhydrous acetic acid to form a batch which is then reacted at about 140° C. in a covered vessel to form the desired end product. This example illustrates the ease with which a metal is converted to a chemical compound and back into a metal.

EXAMPLE 10

The inventive concept can be utilized in taking a copper-base cupro-nickel alloy and converting it to a 70/30 Ni-Cu alloy of the type sold under the trademark Monel. About 870 parts by weight of the cupro-nickel alloy (69.1% Cu, 30.9% Ni) are dissolved in a solution of excess nitric acid in water. A similar second solution is prepared from 1056.8 parts of nickel scrap and the two solutions mixed together and filtered to produce a solution containing about 23 moles of nickel and 10 moles of copper. The solution is concentrated at about 125° C. until about 66 moles of the nitrate compound remain and approximately 26 moles of water of hydration. To this mixed nitrate liquid is added 15,840 parts of anhydrous acetic acid at a temperature of about 120° C. and the batch thus formed heated to 140° C. in a sealed vessel. The reaction is stated in molar quantities as follows:

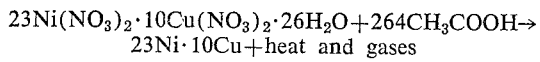
$$23Ni(NO_3)_2 \cdot 10Cu(NO_3)_2 \cdot 26H_2O + 264CH_3COOH \rightarrow$$
$$23Ni \cdot 10Cu + heat\ and\ gases$$

This type of product differs from that made by the mechanical mixing of the powder ingredients in that the particles themselves are binary alloys of very high uniformity.

EXAMPLE 11

This example illustrates the production of a metallic compound from a metal of Group III–A with a metal of Group V–A, for example InBi. High purity indium (99.999%) and bismuth (99.999%) are used as starting materials. Each is converted into a nitrate salt by solution, one salt having a formula of $Bi(NO_3)_3$ and the other $In(NO_3) \cdot NO$.

The bismuth nitrate salt is prepared by first forming a solution comprising 252 parts by weight of fuming nitric acid of specific gravity 1.5 (4 moles) and 1800 parts by weight of anhydrous acetic acid of specific gravity 1.049 (30 moles). To the solution is added 209 parts by weight of the pure bismuth metal in the form of bars which dissolve to form bismuth nitrate, the acetic acid present being sufficient to give the desired mole ratio with the nitrate plus additional acid as solvent for the mixture. The indium nitrate corresponding to the formula

$$In(NO_3) \cdot NO(42.59\%\ In)$$

is dissolved in the bismuth solution containing the excess acetic acid required for the reaction and the whole heated to 140° C. in a covered vessel. The proportions of the foregoing ingredients are stated in molar quantities as follows:

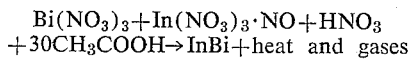
$$Bi(NO_3)_3 + In(NO_3)_3 \cdot NO + HNO_3$$
$$+ 30CH_3COOH \rightarrow InBi + heat\ and\ gases$$

The aforementioned example ilustrates that acetic acid can be present from a previously formulated solution.

My invention is particularly applicable to the production of dispersion-hardened alloys from metals and insoluble non-metals or from substantially immiscible metals. I am able by use of the invention to produce dispersions of less than one micron in fineness. As illustrative of the production of an electrical contact material based on the system Ag-Cu-Ni-W, the following example is given:

EXAMPLE 12

A batch is prepared comprising by weight 2718.2 parts of anhydrous silver nitrate, 4832 parts of hydrated copper nitrate, 2908 parts of hydrated nickel nitrate, 249.9 parts of tungstic acid ($H_2WO_4$) and 18,780 parts of anhydrous acetic acid. The batch is heated through the various phases of the reaction in a sealed container through the exothermic initiation temperature of about 140° C., the foregoing proportions of ingredients being expressed in molar quantities as follows:

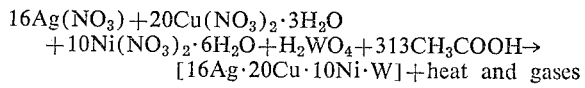
$$16Ag(NO_3) + 20Cu(NO_3)_2 \cdot 3H_2O$$
$$+ 10Ni(NO_3)_2 \cdot 6H_2O + H_2WO_4 + 313CH_3COOH \rightarrow$$
$$[16Ag \cdot 20Cu \cdot 10Ni \cdot W] + heat\ and\ gases$$

EXAMPLE 13

A copper base alloy containing a fine homogeneous distribution of chromium-rich and lead-rich dispersions is prepared as follows:

Ingredients in parts by weight:
2424.6 basic copper carbonate (assay 53% Cu)
4802.2 hydrated chromium nitrate
331.2 anhydrous lead nitrate
9960 anhydrous acetic acid The batch of ingredients is heated through the various phases of the reaction to the exothermic initiation temperature of about 140° C. in a sealed vessel. The reaction utilizing the foregoing proportions of ingredients is expressed in molar quantities as follows:

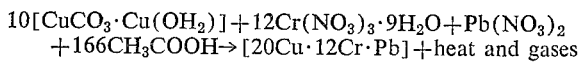
$$10[CuCO_3 \cdot Cu(OH_2)] + 12Cr(NO_3)_3 \cdot 9H_2O + Pb(NO_3)_2$$
$$+ 166CH_3COOH \rightarrow [20Cu \cdot 12Cr \cdot Pb] + heat\ and\ gases$$

As has been previously stated, cermets may be produced in accordance with the invention. The method may be applied to the production of a nickel-chromium alloy known by the trademark Nichrom (a substantially 80:20 nickel-chromium alloy) having dispersed therethrough ultra fine particles of alumina, as illustrated by the following example:

EXAMPLE 14

Ingredients in parts by weight:
11,632 hydrated nickel nitrate
3,561 anhydrous nickel carbonate
2,000 chromium trioxide
1,050 gelatinous aluminum hydroxide (9.7% $Al_2O_3$)
22,320 anhydrous acetic acid The above ingredients are heated in a sealed container through the various stages of the reaction to the exothermic initiation temperature of about 140° C. The foregoing proportions of ingredients are expressed in molar quantities as follows:

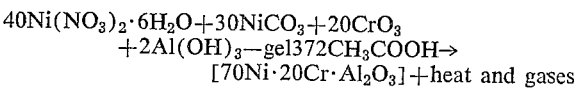
$$40Ni(NO_3)_2 \cdot 6H_2O + 30NiCO_3 + 20CrO_3$$
$$+ 2Al(OH)_3 - gel372CH_3COOH \rightarrow$$
$$[70Ni \cdot 20Cr \cdot Al_2O_3] + heat\ and\ gases$$

The sponge product contained 78.1% Ni, 19.8% Cr and 1.9% $Al_2O_3$.

EXAMPLE 15

A cobalt-base cermet having a dispersion of mixed oxide phases was produced in a similar manner in a covered vessel. The batch is formed of ingredients stated in molar quantities as follows:

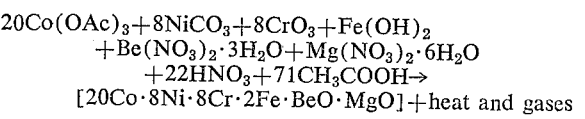
$$20Co(OAc)_3 + 8NiCO_3 + 8CrO_3 + Fe(OH)_2$$
$$+ Be(NO_3)_2 \cdot 3H_2O + Mg(NO_3)_2 \cdot 6H_2O$$
$$+ 22HNO_3 + 71CH_3COOH \rightarrow$$
$$[20Co \cdot 8Ni \cdot 8Cr \cdot 2Fe \cdot BeO \cdot MgO] + heat\ and\ gases$$

Metal shapes fabricated from the sponge product generally exhibit a high degree of dispersion hardening by virtue of the presence of ultra fine dispersions of the oxide.

EXAMPLE 16

Lead containing a dispersion of an oxide of sodium and aluminum is obtained by reacting a batch of ingredients in a sealed vessel at 140° C. according to the molar quantities shown as follows:

18Pb(OAc)$_2$·3H$_2$O+6PbO+[2Al(OH)$_3$—gel]+2NaOH
+4NH$_4$NO$_3$+6CH$_3$COONH$_4$+10CH$_3$COOH→[24Pb
and an oxide of sodium and aluminum]+heat and gases The alumina gel contains 9.7% Al$_2$O$_3$ and is proportioned to provide about 3.2% of an oxide of sodium and aluminum in the lead product.

Although Examples 1 to 16 are illustrative of the use of carboxylic acids derived from the aliphatic hydrocarbons, such as the monobasic acetic acid, or salts of the acid, it will be appreciated that other carboxylic acids or derivatives thereof can be used, such as polybasic acids derived from aliphatic hydrocarbons, or mono- or polybasic acids derived from the aromatic hydrocarbons. As illustrative of a polybasic acid of an aromatic hydrocarbon, phthalic acid is given: C$_6$H$_4$(COOH)$_2$. As in the case of acetic acid, I may use the acid, or its anhydride, or a salt of the acid. The following example illustrates the use of phthalic anhydride in the production of sponge copper.

EXAMPLE 17

To 221.1 parts by weight of basic copper carbonate is added a premixed solution containing 252 parts by weight of fuming nitric acid; 1921.6 parts by weight of isopropyl alcohol and 2369.8 parts by weight of phthalic anhydride. The batch is heated in a sealed container as follows:

It is first heated to a temperature within the range of 50° C. to 100° C. at which temperature the ingredients dissolve one in the other with evolution of some volatile constituents. The temperature is then raised to within the range of 100° C. to 150° C. during which a further release of volatiles is noted. With further heating to about 200° C. the mix becomes viscous, and when the temperature reaches about 290° C., an exothermic reaction is initiated. The foregoing proportions of ingredients are expressed as follows:

CuCO$_3$·Cu(OH)$_2$+4HNO$_3$+16C$_6$H$_4$(CO)$_2$O
+32C$_3$H$_7$OH→2Cu+heat and gases Similar results are obtained by substituting an aliphatic dibasic acid such as malonic acid, i.e. CH$_2$(COOH)$_2$, for phthalic anhydride in the following molar proportions:

2Cu(NO$_3$)$_2$·3H$_2$O+16CH$_2$(COOH)$_2$→2Cu
+heat and gases the reaction being initiated at about 140° C. Another monobasic aliphatic acid, propionic acid (C$_2$H$_5$COOH), also gives good results, utilizing the following molar proportions:

2Cu(NO$_3$)$_2$·3H$_2$O+16C$_2$H$_5$COOH→
2Cu+heat and gases the reaction being initiated at about 160° C.

In all three of the above illustrations, a product of sponge copper is obtained.

EXAMPLE 18

A batch of ingredients is prepared containing acetic acid (specific gravity 1.049), hydrated lead acetate, lead oxide and sodium nitrate in molar proportions as given below. The batch is heated as in Example 1 except that the exothermic reaction took place with an explosive-type force. The molar proportions employed are as follows:

2.1Pb(OAc)$_2$·3H$_2$O+1.5PbO+5.4NaNO$_3$
+35HOAc→ explosive-type reaction and heat and gases and forming a product believed to be (Na$_2$PbO$_6$+PbO·Pb$_3$O$_4$)

The term "organic reagent" as applied to carboxylic acids and derivatives thereof as used in the broad sense is meant to cover that part of the reagent essential to the carrying out of the reaction, even though such reagent might be added as a metal salt. For example, acetic acid, which is a carboxylic acid, may be the reagent in one instance, while in another instance the reagent might take the combined form of a metal acetate. The term "carboxylic acids and salts thereof" is meant to cover such organic reagents when used either as the acid or in the form of a salt, anhydride, corresponding aldehyde, and the like.

Likewise the term "oxidizing acids and salts thereof" is meant to cover acids and materials which behave like the acids, e.g., salts of the acid whether derived directly or indirectly from the acid. Thus, it is possible to carry out the reaction of the invention by merely using the derivatives defined herein. For example, one mole of Cu(OAc)$_2$ may be exothermically reacted with one mole of Cu(NO$_3$)$_2$ even though neither acetic nor nitric acids as such are present.

The exothermic reaction of the invention is intrinsically self-propagating and appears primarily to be of the adiabatic type. That is, in the few seconds that it occurs (the reaction is almost instantaneous), it proceeds with little loss of heat to the surrounding environment. This seems evidenced by the fact that over the short time interval during which reaction occurs, the products of the reaction appear to remain together in a mass, whereby the mass assumes a temperature substantially higher than the initiation temperature of the reaction. Immediately upon completion of the reaction, there is an increase of pressure and volume within the system.

The reaction appears to differ from those reactions based on conventional mixtures of reagents, in that it proceeds almost instantaneously as an exothermic decomposition of a viscous mass.

Examples of metals which may be employed in carrying out the invention include Cu, Ag, and Au; Zn, Cd, and Hg; Ga, In, and Tl; Ge, Sn and Pb; Sb and Bi; Cr, Mo and W; Mn, Fe, Ni and Co; Th; U, the platinum group metals, etc. By use of several different metals or metal cations, the invention is particularly applicable to the production of well known nickel-base, iron-base, cobalt-base, copper-base and lead-base alloys, as well as alloys based on other systems. The alloys may be produced from elements which are compatible with each other and those which are immiscible. For example, iron-copper alloys can be produced over a wide range of compositions even though the elements exhibit very limited mutual solubility. This is also true with respect to copper-lead alloys, lead-tungsten alloys, copper-chromium alloys, copper-tungsten alloys and the like.

It is preferred that the metals be those characterized by a negative free energy of formation of the oxide referred to 25° C. ranging up to about 90,000 calories per gram atom of oxygen. Chromium is an example of a metal near the upper range. With respect to those metals whose oxides have free energies of formation substantially exceeding 90,000 calories, for example above 95,000 calories per gram atom of oxygen, such as silicon, aluminum, beryllium, magnesium, etc., I find I can combine them with metals having lower free energies of oxide formation in forming metal-metal oxide systems, such as finely dispersed systems based on Cu-SiO$_2$, Cu-Al$_2$O$_3$, Ni-Al$_2$O$_3$, Co-BeO, Fe-Al$_2$O$_3$, Pb-Al$_2$O$_3$, etc. Thus, in forming the system based on Cu-Al$_2$O$_3$, I would react 16 moles of Cu carbonate, 2 moles of aluminum nitrate and 39 moles anhydrous acetic acid under inert or reducing conditions as follows:

$$16CuCO_3 + 2Al(NO_3)_3 \cdot 9H_2O + 39HOAc \rightarrow Cu-Al_2O_3 + \text{heat and gases}$$

The foregoing would form a metal-metal oxide dispersion of approximately 90% Cu with about 10% $Al_2O_3$ finely dispersed therethrough. Such systems are capable of being worked into wrought structures exhibiting high strength and good resistance to creep.

It will be appreciated that the invention provides as a composition of matter a batch of ingredients capable of reacting exothermically when heated to an elevated exothermic initiating temperature. Broadly, such composition will comprise said first and second reagents, with substantially the balance being a metal or metal compound soluble or dispersible in said reagents when the batch is heated to elevated temperature, the molar ratio of the first to the second reagent being at least sufficient to sustain said exothermic reaction, preferably at least about 0.2 and less than about 10.

The invention also provides as an article of manufacture a glassy substance capable of decomposing exothermically. As a preferred embodiment, the invention provides said glassy substance containing a metal cation with substantially the balance of the glassy substance comprising said first and second reagent in molar ratio of at least about 0.2 and less than about 10.

As employed herein, the expression "acetate anion" refers to the acetate moiety whether in the ionized state or unionized, as may be the case for example in acetic acid.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. In a method for producing exothermic reactions, the steps comprising providing a mixture of ingredients containing a first reagent selected from the group consisting of carboxylic acids of 2 to 10 carbon atoms and salts thereof, a second reagent selected from the group consisting of oxidizing acids and salts thereof, and a metallic element in combined form, said element being selected from the group consisting of those of atomic number at least 24 of the Groups I–B, II–B, III–A, IV–A, V–A, VI–A, VI–B, VII–B and VIII of the Periodic Table and thorium and uranium, the sum of the concentrations of said first and second reagents being selected to provide at least one molar equivalent per mole of said metallic element and a molar ratio of said first to said second reagent of at least about 0.2 and less than about 10 after vaporization of any excess volatile reagent, heating said mixture for a time at least sufficient to boil off volatile components and to form a viscous liquid, and cooling said viscous liquid, to a solid glassy mass capable of decomposing exothermically when heated to elevated temperature.

2. The method of claim 1 wherein the molar ratio of said first reagent to said second reagent ranges from about 0.4 to 2.5.

3. The method of claim 1 wherein the molar ratio of said first reagent to said second reagent ranges from about 0.8 to 1.7.

4. In a method for producing exothermic reactions, the steps comprising forming a mixture of a first reagent selected from the group consisting of carboxylic acids of 2 to 10 carbon atoms and salts thereof, a second reagent selected from the group consisting of oxidizing acids and salts thereof, and a metal cation in a form selected from the group consisting of oxides, hydroxides, carbonates, ammonium complexes, chelates, carboxylate salts and mineral acid salts of metallic elements of atomic number at least 24 in Groups I–B, II–B, III–A, IV–A, VA, VI–A, VI–B, VII–B and VIII of the Periodic Table and of thorium and uranium, the sum of the concentrations of said first and second reagents being selected to provide at least one molar equivalent per mole of said metal cation and a molar ratio of said first to said second reagent of at least about 0.2 and less than about 10 after vaporization of any excess volatile reagent, heating said mixture for a time at least sufficient to boil off volatile components and to form a viscous liquid, and cooling said viscous liquid to a solid glassy mass capable of decomposing exothermically when heated to elevated temperature.

5. The method of claim 4 wherein said carboxylic acid and salts thereof are acetates and said oxidizing acid and salts thereof are nitrates.

6. In a method for producing exothermic reactions, the steps comprising forming a mixture of a first reagent selected from the group consisting of carboxylic acids of 2 to 10 carbon atoms and salts thereof, a second reagent selected from the group consisting of oxidizing acids and salts thereof, and a metal cation in a form selected from the group consisting of oxides, hydroxides, carbonates, ammonium complexes, chelates, carboxylate salts and mineral acid salts of metallic elements of atomic number at least 24 in Groups I–B, II–B, III–A, IV–A, V–A, VI–A, VI–B, VII–B and VIII of the Periodic Table and of thorium and uranium, the sum of the concentrations of said first and second reagents being selected to provide at least one molar equivalent per mole of said metal cation and a molar ratio of said first to said second reagent of at least about 0.2 and less than about 10 after vaporization of any excess volatile reagent, and exothermically reacting said mixture by heating it to an elevated temperature.

7. The method of claim 6 wherein said carboxylic acid and salts thereof are acetates and said oxidizing acid and salts thereof are nitrates.

8. The method of claim 7 wherein the molar ratio of said first reagent to said second reagent ranges from about 0.4 to 2.5.

9. The method of claim 7 wherein the molar ratio of said first reagent to said second reagent ranges from about 0.8 to 1.7.

10. In a method for producing a metal-containing product, the steps comprising forming a mixture of a first reagent selected from the group consisting of carboxylic acids of 2 to 10 carbon atoms and salts thereof, a second reagent selected from the group consisting of oxidizing acids and salts thereof, and a metal cation in a form selected from the group consisting of oxides, hydroxides, carbonates, ammonium complexes, chelates, carboxylate salts and mineral acid salts of metallic elements of atomic number at least 24 in Groups I–B, II–B, III–A, IV–A, V–A, VI–A, VI–B, VII–B and VIII of the Periodic Table and of thorium and uranium, the sum of the concentrations of said first and second reagents being selected to provide at least one molar equivalent per mole of said metal cation and a molar ratio of said first to said second reagent of from about 0.8 to 1.7 after vaporization of any excess volatile reagent, and exothermically reacting said mixture by heating it to an elevated temperature, whereby energy is released accompanied by the formation of a metal-containing product.

11. The method of claim 10 wherein said carboxylic acid and salts thereof are acetates and said oxidizing acid and salts thereof are nitrates.

12. In a method for producing an alloy metal-containing product the steps comprising forming a mixture of a first reagent selected from the group consisting of carboxylic acids of 2 to 10 carbon atoms and salts thereof, a second reagent selected from the group consisting of oxidizing acids and salts thereof, and at least two different metal cations in a form selected from the group consisting of oxides, hydroxides, carbonates, ammonium complexes, chelates, carboxylate salts and mineral acid salof metallic elements of atomic number at least 24 in Groups I–B, II–B, III–A, IV–A, V–A, VI–A, VI–B, VII–B and VIII of the Periodic Table and of thorium and uranium, the sum of the concentrations of said first and second reagents being selected to provide at least one molar equivalent per mole of said metal cations and a molar ratio of said first to said second reagent of from about 0.8 to 1.7 after vaporization of any excess volatile reagent, and exothermically reacting said mixture by heating it to an elevated temperature, whereby energy is released accompanied by the formation of an alloy metal-containing product.

13. The method of claim 12 wherein said carboxylic acid and salts thereof are acetates and said oxidizing acid and salts thereof are nitrates.

14. The method of claim 13 wherein the metal cations are chosen to provide a nickel-base alloy.

15. The method of claim 13 wherein the metal cations are chosen to provide a cobalt-base alloy.

16. The method of claim 13 wherein the metal cations are chosen to provide an iron-base alloy.

17. The method of claim 13 wherein the metal cations are chosen to provide a copper-base alloy.

18. The method of claim 13 wherein the metal cations are chosen to provide a lead-base alloy.

19. In a method for producing a metal-metal oxide dispersion, the steps comprising forming a mixture of a first reagent selected from the group consisting of carboxylic acids of 2 to 10 carbon atoms and salts thereof, a second reagent selected from the group consisting of oxidizing acids and salts thereof, a first metal cation in a form selected from the group consisting of oxides, hydroxides, carbonates, ammonium complexes, chelates, carboxylate salts and mineral acid salts of metallic elements of atomic number at least 24 in Groups I–B, II–B, III–A, IV–A, V–A, VI–A, VI–B, VII–B and VIII of the Periodic Table and of thorium and uranium and a second metal cation characterized by a negative free energy of formation of the oxide substantially above 90,000 calories per gram atom of oxygen at 25° C., the sum of the concentrations of said first and second reagents being selected to provide at least one molar equivalent per mole of said first metal cation and a molar ratio of said first to said second reagent of from about 0.8 to 1.7 after vaporization of any excess volatile reagent, and exothermically reacting said mixture by heating it to an elevated temperature, whereby energy is released accompanied by the formation of a metal-metal oxide product.

20. The method of claim 19 wherein said carboxylic acid and salts thereof are acetates and said oxidizing acid and salts thereof are nitrates.

21. As a composition of matter, a batch of ingredients capable of reacting exothermically when heated to an elevated exothermic-initiating temperature, which comprises a metallic element in combined form, said element being selected from the group consisting of those of atomic number at least 24 of the Groups I–B, II–B, III–A, IV–A, V–A, VI–A, VI–B, VII–B and VIII of the Periodic Table and thorium and uranium, mixed with a first reagent selected from the group consisting of carboxylic acids of 2 to 10 carbon atoms and salts thereof and a second reagent selected from the group consisting of oxidizing acids and salts thereof, the sum of the concentrations of said first and second reagents being selected to provide at least one molar equivalent per mole of said metallic element and a molar ratio of said first to said second reagent of at least about 0.2 and less than about 10 after vaporization of any excess volatile reagent.

22. The composition of claim 21 wherein said carboxylic acid and salts thereof are acetates and said oxidizing acid and salts thereof are nitrates.

23. The composition of claim 21 wherein the molar ratio of said first to said second reagent ranges from about 0.4 to 2.5.

24. The composition of claim 21 including a second metal cation characterized by a negative free energy of formation of the oxide at 25° C. substantially above 90,000 calories per gram atom of oxygen.

25. As an article of manufacture, a glassy substance capable of decomposing exothermically when heated to an elevated exothermic-initiating temperature comprising a metallic element in combined form, said element being selected from the group consisting of those of atomic number at least 24 of Groups I–B, II–B, III–A, IV–A, V–A, VI–A, VI–B, VII–B and VIII of the Periodic Table and thorium and uranium; a first reagent selected from the group consisting of carboxylic acids of 2 to 10 carbon atoms and salts thereof; and a second reagent selected from the group consisting of oxidizing acids and salts thereof; the sum of the concentrations of said first and second reagents being selected to provide at least one molar equivalent per mole of said metallic element and a molar ratio of said first to said second reagent of at least about 0.2 and less than about 10.

26. The article of manufacture of claim 25 wherein said carboxylic acid and salts thereof are acetates and said oxidizing acid and salts thereof are nitrates.

No references cited.

L. DEWAYNE RUTLEDGE, *Primary Examiner.*

H. W. TARRING, *Assistant Examiner.*

U.S. Cl. X.R.

75—121